(12) United States Patent
Li et al.

(10) Patent No.: US 12,143,448 B2
(45) Date of Patent: Nov. 12, 2024

(54) INTEGRATION OF INTERNET OF THINGS DEVICES

(71) Applicant: Huawei Technologies Co., Ltd., Shenzhen (CN)

(72) Inventors: Xiaofeng Li, Plano, TX (US); Yiwei Zhao, San Jose, CA (US); Wenyou Sun, Cupertino, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/904,635

(22) PCT Filed: Feb. 20, 2020

(86) PCT No.: PCT/US2020/019072
§ 371 (c)(1),
(2) Date: Aug. 19, 2022

(87) PCT Pub. No.: WO2020/107040
PCT Pub. Date: May 28, 2020

(65) Prior Publication Data
US 2023/0086979 A1 Mar. 23, 2023

(51) Int. Cl.
*G06F 15/16* (2006.01)
*H04L 67/125* (2022.01)
*H04L 67/52* (2022.01)

(52) U.S. Cl.
CPC ............ *H04L 67/125* (2013.01); *H04L 67/52* (2022.05)

(58) Field of Classification Search
CPC .............................. H04L 67/125; H04L 67/52
USPC .......................................................... 709/217
See application file for complete search history.

(56) References Cited

U.S. PATENT DOCUMENTS

| 10,257,320 | B2 | 4/2019 | Bauer et al. |
| 11,374,779 | B2 * | 6/2022 | Sanders ................. H04L 67/56 |
| 2016/0342906 | A1 * | 11/2016 | Shaashua .............. H04L 67/306 |
| 2018/0349314 | A1 | 12/2018 | Angus et al. |
| 2019/0164087 | A1 * | 5/2019 | Ghibril ..................... G06N 5/02 |
| 2020/0364588 | A1 * | 11/2020 | Knox ...................... G06V 40/20 |
| 2020/0380968 | A1 * | 12/2020 | Hatfield .................. G06F 16/90 |
| 2021/0301985 | A1 * | 9/2021 | Brown ............... G05B 23/0221 |

FOREIGN PATENT DOCUMENTS

| CN | 101553783 A | 10/2009 |
| CN | 107222454 A | 9/2017 |
| CN | 110457569 A | 11/2019 |

* cited by examiner

*Primary Examiner* — Alan S Chou
(74) *Attorney, Agent, or Firm* — Slater Matsil, LLP

(57) ABSTRACT

Methods, systems, and apparatus, including computer programs encoded on computer storage media, for leveraging Internet of things (IoT) devices that can communicate and interact with one another. In some implementations, at least one external device within proximity to an end-user device is determined. Context information of the end-user device is determined. Based on the context information of the end-user device, a connection with the at least one external device is established. Functionality corresponding to the at least one external device is identified. A virtual device associated with the at least one external device is identified. The identified virtual device is provided to the end-user device for performing the functionality of the at least one external device by the end-user device.

21 Claims, 9 Drawing Sheets

INTEGRATION OF INTERNET OF THINGS DEVICES

CROSS-REFERENCE TO RELATED APPLICATIONS

This application is a National Stage of International Application No. PCT/US2020/019072, filed on Feb. 20, 2020, titled "Integration of Internet of Things Devices," application of which is hereby incorporated herein by reference in its entirety.

TECHNICAL FIELD

The present disclosure relates generally to Internet of Things (IoT), and, in particular embodiments, to integration of IoT devices.

BACKGROUND

Contemporary smart devices, e.g., smartphones, typically include built-in peripheral components such as a display, a camera, a touch-sensitive display, a speaker, and a microphone. Additionally, these smart devices include different peripheral buses, e.g., Bluetooth, WiFi, and Universal Serial Bus (USB), which can extend capability to connect and operate with external devices. For example, a speaker compatible with Advanced Audio Distribution Profile (A2DP) can be connected to a smart phone and play music through Bluetooth.

However, operating external peripherals connected to a smart device is not as simple as operating peripherals integrated into the smart device. For example, if a user has access to an external camera, e.g., a web camera, the user may have difficulty accessing—let alone utilizing—the external camera in video chatting applications on the user's smartphone. Typically, the video chatting applications and other applications only work with the devices integrated into the smartphone and not with external peripherals. As external peripherals may have capabilities above and beyond those incorporated into conventional smartphones or other "host" devices, the capabilities of such external peripherals cannot be used, thus compromising the overall quality and capability of the communications experience. Moreover, because many external peripherals exist, application developers have difficulty enabling their applications to work with the external peripherals.

SUMMARY

In some implementations, the specification describes techniques for leveraging internet of things (IoT) devices that can communicate and interact among each other over a network. In particular, the techniques can include providing a smart device access to application programmable interfaces (APIs) corresponding to external peripheral devices. By enabling the smart phone to have access to the APIs of the external peripheral devices, the smart phone can then locally access built-in devices, external peripheral devices, and a combination of these for a various applications. In particular, an operating system of the smart device can include various APIs of external peripheral devices that provide the framework for a smart device to directly access the external peripheral device of choice. Thus, smart device users are afforded access to external peripheral devices as if they were internal built-in devices.

In one general aspect, a method includes: determining, by a device manager, at least one external device within proximity to an end-user device; determining, by the device manager, context information of the end-user device; based on the context information of the end-user device, establishing, by the device manager, a connection with the at least one external device; identifying, by the device manager, a functionality corresponding to the at least one external device; identifying, by the device manager, a virtual device associated with the at least one external device; and providing, by the device manager, the identified virtual device to the end-user device for performing, by the end-user device, the functionality of the at least one external device.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the at least one external device includes a smartphone, a camera, a television, a microphone, a smart watch, a heart rate monitor, an automotive head unit from a vehicle, a drone, a smart lock, or other smart device whose service is accessible to the end-user device upon establishment of an appropriate connection.

In some implementations, identifying the functionality corresponding to the at least one external device further includes: obtaining, by the device manager and from the at least one external device, a set of functions corresponding to the at least one external device; or obtaining, by the device manager, the functions corresponding to the at least one external device from a database based on a previous establishment of a connection with the at least one external device.

In some implementations, determining the context information of the end-user device further includes: determining, by the device manager, a location of the end-user device; determining, by the device manager, one or more applications on the end-user device; and determining, by the device manager, characteristics of a type of the end-user device.

In some implementations, determining the context information of the end-user device can include determining, by the device manager, at least one function provided by the at least one external device not currently available to the one or more applications on the end-user device; and receiving, by the device manager, requests from the one or more applications on the end-user device to access the at least one function provided by the at least one external device.

In some implementations, identifying the virtual device associated with the at least one external device includes: providing, by the device manager, control information to the at least one external device to control the at least one external device; receiving, by the device manager, at least one device specification corresponding to the at least one external device, the at least one device specification including a type of a function provided by the at least one external device, services of the function, protocols of the function, application program interfaces (APIs) of the function, and quality of media data provided by the function; and storing, by the device manager in a database, the identified virtual device for the at least one external device, wherein functions corresponding to the identified virtual device are identified to the end-user device and to other external devices for use.

In some implementations, the method includes providing, by the device manager, recommendations of at least one external device within proximity to the end-user device to the end-user device based on preferences associated with the end-user device, wherein the preferences are based on one or more of previous selections of the set of functionality from the external devices, applications currently executing on the end-user device, a capability of the end-user device, a location of the end-user device, and a usage time of the end-user device combined with the applications currently executing on the end-user device.

In some implementations, providing the recommendations of external devices to the end-user device further includes: generating, by the device manager, predicted likelihoods of external device recommendations based on the preferences associated with the end-user device; ranking, by the device manager, the external device recommendations based on the generated predicted likelihoods; and providing, by the device manager, the ranked external device recommendations to the end-user device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION OF ILLUSTRATIVE EMBODIMENTS

Figure 1:
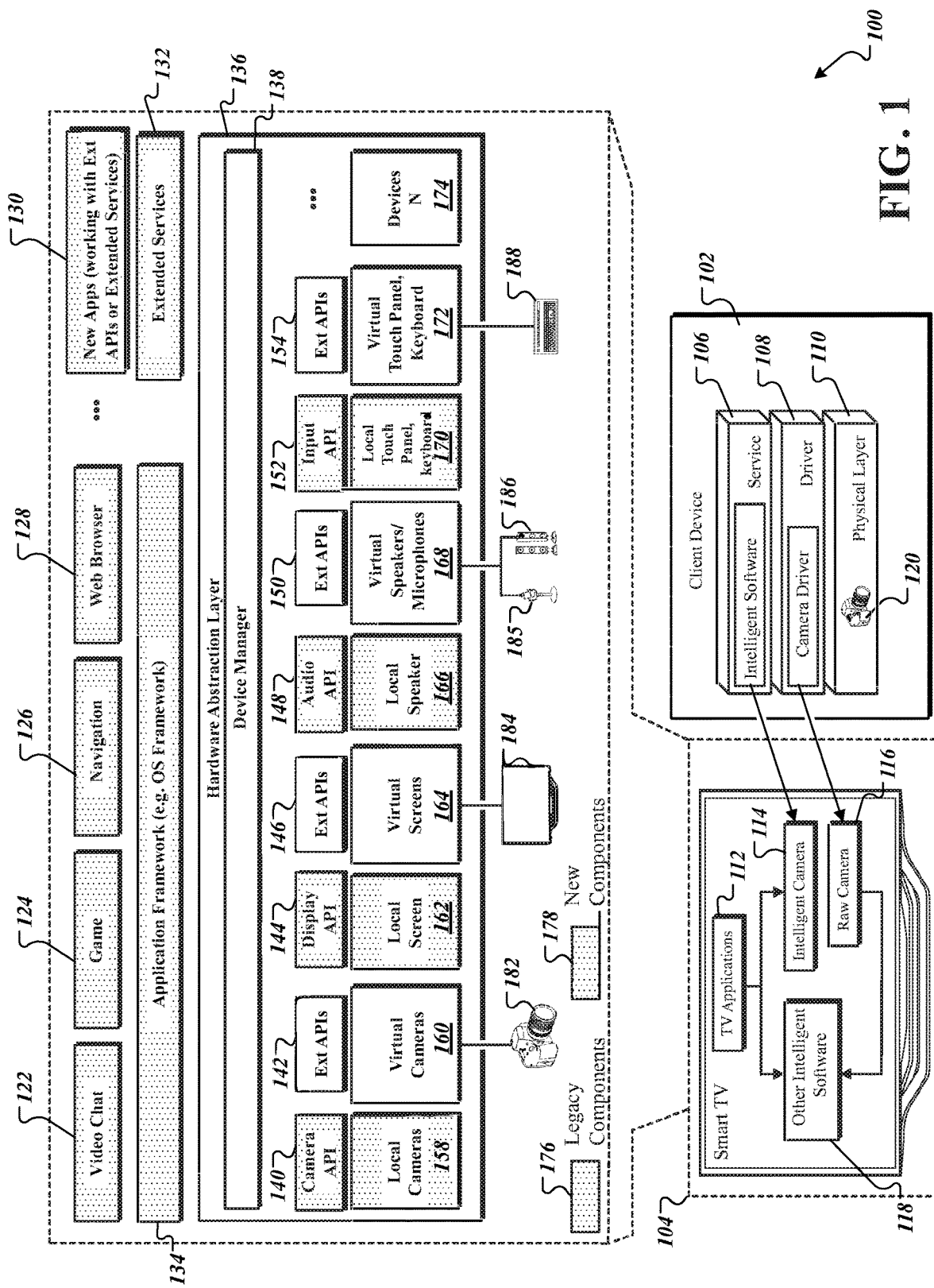
FIG. 1 is a block diagram that illustrates an example of a system for integrating an application programmable interface (API) of one or more external devices into a smart device.

Typically, a smart device can connect to external devices, e.g., external cameras, using a wired connection or a wireless connection. The wired connection can include USB or ethernet connections, for example. The wireless connection can include WiFi, Bluetooth, or other wireless connections, for example. In some cases, an operating system includes various classes to control and communicate with the external camera device. A number of preconditions can enable an operating system to connect with an external device such as a USB connectable camera. In the example of a USB connectable camera, the operating system of a smart device can be capable of constructing a "USB Video Class (UVC)" for communicating with an external camera device over USB and a video driver for controlling the external camera device. The operating systems should preferably include a hardware abstraction layer (HAL) and framework that can identify a number of external camera devices identified from a scan of available devices and provide application programmable interfaces (APIs) for external application uses. Camera applications running on the host smart device should be "external-camera" aware such that they can detect available external cameras, and the applications should proactively control the external camera while providing a medium, e.g., display, for the external camera to render content.

Unfortunately, not all operating system include a built-in UVC, and most smart device applications only recognize and control integrated front and back cameras. For example, popular video chat applications on smart devices only control front and back cameras on smart devices. Thus, even when users have connected USB cameras with their smart devices, a user's video chatting application ignores the presence of the external camera(s) and instead connects with the internal camera. USB external cameras may only be used by applications that are specifically designed to use USB external cameras.

Wireless connected cameras are typically used in surveillance applications, such as remote baby monitoring, home security, and commercial security. From an operating system perspective, the external camera device is the source of live video streaming. The external camera device provides a video streaming service and the video application on the operating system, as a client, receives the video streaming and controls the video streaming progress. Although surveillance applications can control external cameras, surveillance applications cannot provide camera services to other application. For example, other popular video chatting applications on the operating system cannot use the external security video camera.

Thus, in order to blur the differences between external camera devices and internal camera devices, this specification describes a device manager which can manage or create, for example, a "virtual camera," which is used to establish a connection with an external device, such as an external camera, and controls the external device. For example, the virtual camera at the operating system of the smart device establishes connection with the external camera, controls the external camera's media, and receives video streaming from the external camera. Additionally, the virtual camera implements standard camera APIs to make the external camera function with the operating system and its various applications. Additionally, the operating system includes a "Device Manager" that manages built-in devices of the smart device and virtual devices, e.g., smart devices, and decides whether a virtual device or a built-in device should be used for a particular application based on context of the smart device. The "virtual camera" can simulate external cameras as if they were built-in cameras, e.g., front and rear cameras. As a result, applications in the smart device can operate with either the external camera or the built-in camera without any physical change. This enables use of external camera features not found in the built-in camera, such as pan, tilt, zoom, and motion tracking, thus significantly enriching a user's experience with the external camera.

FIG. 1 is a block diagram that illustrates an example of a system 100 for integrating an application programmable interface (API) of one or more external devices into a smart device. The techniques provided with system 100 leverage external devices, such as Internet of Things (IoT) devices, with peripherals of smart devices over a network. This is advantageous, as it allows users to utilize the external devices and their corresponding functionality on their smart device as if the external devices were built-in to the smart device. For example, an application in a smart watch, e.g., the smart device, can utilize the functionality of an external camera as its internal camera, and can display the video from the external camera on the display of the smart watch. Additionally, an application in a smart TV, such as a video conferencing application, can use the facial recognition technology and camera of a smartphone to perform facial recognition upon giving a user access to the application in the smart TV. Any other suitable combination of functionality can be used to provide applications of a smart device with the functionality from one or more external devices.

As illustrated in system 100, a smart television (TV) 104 communicates with a client device 102. The client device 102 can be a peripheral, such as a handheld device, a mobile telephone, a personal computer, a personal digital assistant (PDA), and a camera, to name a few examples. The smart TV 104 and the client device 102 can communicate with one another over a network (not shown). The network can be a wired or a wireless network. For example, the network can include an ethernet or USB connection. Additionally, in some examples, the network can include a WiFi, Bluetooth, Long-Term Evolution (LTE), or ZigBee connection.

The client device 102 can include a service layer 106, a driver layer 108, and a physical layer 110. As illustrated in system 100, the intelligent software represents the service layer 106. For example, a camera of smart phone, e.g., camera 120 within client device 102, can be used as an external device within another smart TV, e.g., smart TV 104. In this case, the client device 102 can export its camera, e.g., camera functionality, to the smart TV 104 for giving the smart TV 104 access to the camera of the client device 102. In another example, the client device 102 can include facial recognition software and export this as intelligent software to the smart TV 104, such that the smart TV 104 can utilize the facial recognition technology of the client device 102. In this example, the smart TV 104 can perform facial recognition which is a service provided by the client device 102. In another example, the smart TV 104 can include its own facial recognition software as a component of the TV's "Other Intelligent Software" 118, such that the TV incorporates the functionality of the camera from client device 102 as a virtual camera device. This will be further explained below.

The client device 102 also includes a driver layer 108 that can control the associated device. In particular, the driver layer 108 can include a driver for each component internal and external to the client device 102. The driver provides a software interface to these hardware components, enabling the operating system, the processor, and other applications of the client device 102 to access functions associated with the hardware components without needing to know precise details about the hardware components being utilized. For example, system 100 illustrates the driver layer 108 includes a camera driver that allows the client device 102 to utilize the internal camera 120. Additionally, the client device 102 can provide the camera driver to other external components, such as the smart TV 104 or a smart watch, for which the functionality of the camera is desired.

The client device 102 also includes a physical layer 110. The physical layer 110 includes bit and byte level communications between physical and virtual devices of the client device 102. For example, the client device 102 can include software at its physical layer for communication between a processor of the client device 102 and a camera 120 of the client device 102.

The smart TV 104 can include a variety of controls for executing software for built-in hardware and external hardware. In particular, the smart TV 104 can include TV applications 112 and other intelligent software 118. The smart TV 104 also includes other components, as those listed in system 100 are not illustrative of all the TV applications 112. For example, the smart TV 104 can include TV applications such as, NETFLIX, AMAZON PRIME VIDEO, HULU, video conferencing applications, and YOUTUBE, to name a few examples. The smart TV applications 112 can use either the other intelligent software 118 or the intelligent camera module 114. For example, the intelligent camera module 114 can provide a facial recognition capability and the other intelligent software 118 can provide a facial image editing and filtering software for the TV applications 112.

The other intelligent camera module 118 can include one or more software and hardware components for controlling the operations of the built-in cameras and external cameras. In some instances, no built-in cameras may be a part of the smart TV 104, such that the intelligent module 114. The intelligent camera module 114 provides the TV applications 112 access to the built-in intelligent software and the cameras. Additionally, the intelligent camera module 114 can include the intelligent software from the client device 102 for enabling the smart TV 104 to utilize the camera and the functionality of the camera from the client device 102. The intelligent camera module 114 can be obtained or accessed from the client device 102. Additionally, the raw camera module 116 can include a "virtual" camera provided by the client device 102 with its own intelligence, as well as an internal camera for the smart television 104.

The smart television 104 can include a variety of legacy and new or updated components for providing a user with access to internal and external components. In the illustrated implementation, the legacy components are illustrated by legend 176 and can include, for example, a video chat application 122, a game application 124, a navigation application 126, and a web browser 128, and certain legacy APIs, among others. New components are illustrated by legend 178 and can include, for example, a hardware abstraction layer 136 and its device manager 138, as well as new APIs used to connect to external devices, as described herein. As illustrated in system 100, the example smart television 104 includes various applications, such as video chat application 122, a game application 124, a navigation application 126, a web browser application 128, and other new applications 130. The other new applications 130 can work with extended APIs or extended services provided by other devices, such as, the client device 102. These applications can be stored on the smart device 104 or accessed by the smart device 104 over a network in a database. The extended services 132 correspond to the functionality provided by the other devices for the other new applications 130. In particular, the applications can use functions provided by the extended services. For example, the extended services 132 may provide pan/ tilt/zoom (P/T/Z) movements for camera motion. Additionally, the extended services 132 can also represent the services provided by external smart devices and facilitate local applications to use the external services.

The smart television 104 also includes an application framework 134 and a hardware abstraction layer 136. The application framework 134 includes an operating system framework that manages computer hardware and software resources on the smart television 104. Additionally, the application framework 134 provides common services for computer programs or applications that execute on the smart television 104. The application framework 134 provides the ability for hardware and software components to communicate and work seamlessly together.

The hardware abstraction layer 136 includes a device manager 138 and multiple APIs and their implementations (i.e. virtual device) for internal and external devices, wherein the device manager 138 manages both the internal devices and external devices. In some instances, the device manager 138 can manage, concurrently, both internal and external devices, as well as multiple internal and/or external devices, also concurrently. In some examples, at least some of the external devices that may be used by the smart TV 104 can may be provided by or associated with the client device 102. When the smart television 104 seeks to interact with external devices—or vice versa—the smart television 104, via the device manager 138, loads a virtual device for each external device. In particular, the device manager 138 generates or instantiates a virtual device for controlling functionality of an external device to be controlled and/or interacted. For example, the device manager 138 provides the virtual device 160 to camera applications, such as video chat 122 (e.g. Skype). Because the virtual device 160 has implemented the camera APIs 140, the legacy camera applications can invoke the virtual device 160's functions (e.g. preview command) in a similar manner as invoking Local Cameras 158. In this manner, camera applications can work seamlessly with virtual devices. The extended camera API 142 is an extension to the camera API 140, which corresponds to the internal built-in camera on the smart television 104. The extended camera API 142 includes new interfaces which have been implemented by virtual device 160. Additionally, because legacy camera applications do not know the existence of extended APIs, they will not invoke those new APIs. A user interacting with the cameras on the smart television 104 will not be able to tell from software if the smart television 104 is using the internal camera, e.g., local cameras 158, or the external camera 182 (through virtual cameras 160) from the client device 102, for example. However, the user can analyze the video feed on the display from the cameras to determine which camera is recording video.

The device manager 138 can include software for controlling other internal components of the smart TV 104 and other external peripherals. For example, the smart TV 104 may seek to include heartbeat and other health functionality from a smart watch, audio functionality from speakers, and other functionality from a client device, such as its connectivity to the Internet. The device manager 138 provides the smart TV 104 access to other external hardware and software components within proximity to the smart TV 104. In some examples, the device manager 138 provides the smart TV 104 access to other external hardware and software components not within proximity to the smart TV 104 when the smart TV 104 has connectivity to the Internet. Additionally, the other external hardware and software components require access to the Internet when not within proximity to the smart TV 104.

The extended camera API 142 is implemented by virtual device 160 and enables new applications, such as new apps 130, to invoke new functions that external camera 182 provides, for example, functions such as pan, tilt, and zoom. The device manager 138 manages the hardware abstraction layer APIs, e.g., extended APIs and internal device APIs. Additionally, the device manager 138 enables third party applications that exist on the smart television 104 to interact with external devices in the same manner as if the third party applications were to interact with the internal devices using the hardware abstraction layer APIs.

As illustrated in system 100, the hardware abstraction layer 136 includes legacy device APIs: camera API 140, display API 144, audio API 148, and input API 152. Additionally, the hardware abstraction layer 136 includes extended APIs: extended camera API 142, extended screen API 146, extended speakers/microphones API 150, and extended touch panel, keyboard API 154. The APIs found in the hardware abstraction layer 136 are used to declare what functions a component can provide for other components to use. In particular, the APIs, as illustrated in system 100, provide the smart television 104 access to the functionality and operations of particular components. The functionality of particular components can include instructions for operating a particular component, such as, instruction to a camera to record video. For example, the camera device API 140 makes available, or exposes, the functionality of the local built-in camera device 158. Additionally, both camera device API 140 and extended API 142 introduce and make available the functionality of the virtual camera device 160 and external camera device 182. In particular, the extended API 142 exposes additional functionality provided by the virtual camera device 60 and the external camera 182. In another example, the audio API 148 makes available the functionality of the local built-in speaker device 166. Additionally, both the audio device API 148 and the extended speakers API 150 make available the functionality of virtual speaker/microphone device 168, the external microphone 185, and the external speaker 186. Thus, the smart television 104 can incorporate the functionality provided and made available by the APIs into its applications for a user to utilize. For example, the smart television 104 can display the available functionality of the external camera 182 or the external keyboard 188 when the user views the web browser application 128. In this example, the user can then use the functionality of the external camera 182 or the external keyboard 188 with the web browser application 128 on the smart television 104.

Additionally, the hardware abstraction layer 136 may include other devices N 174, corresponding virtual devices, and their corresponding APIs. The virtual devices, as shown in system 100, e.g., virtual cameras 160, virtual screens 164, virtual speakers/microphones 168, and virtual touch panels/keyboards 172, include software for implementing the extended APIs for a particular device. Each of the virtual devices should implement legacy APIs and extended APIs. The virtual devices implement both the legacy device APIs and the extended APIs so that legacy applications and frameworks can work with the virtual devices without any changes. Additionally, the virtual devices may include extended functionalities that are not found in the local APIs or local devices. Further, in instances where local versions of particular devices or functionality are not a part of the smart device, such as where an integrated camera is not included or available, the hardware abstraction layer 136 and device manager 138 can still use external cameras by instantiating one or more virtual cameras 160 associated with external devices. The camera API 140 allows the smart television 104 to utilize the local camera devices 158 and the virtual devices 160. Additionally, the extended camera API 142 allows the smart television 104 to utilize the extended functionalities of virtual devices 160 only. For example, the virtual devices 160 can include software that implements the extended functionality of an external camera 182, e.g., implements the extended functionality called by the extended camera API 142. The extended functionality can include performing pan, tilt, and zoom. The display API 144 allows the smart television 104 to utilize the local screen device 162 and the virtual screen devices 164. Additionally, the extended screen API 146 allows the smart television 104 to utilize the extended functionalities of virtual screen 164 only. For example, the virtual screen device 164 can include software that implements the functionality of an external television 184, e.g., implements the functionality resulting from function calls exposed by the extended screen API 146. The audio API 148 allows the smart television 104 to utilize the local speaker 166 and the virtual speaker/microphone device 168. Additionally, the extended speakers/microphones API 150 allows the smart television 104 to utilize the extended functionalities of virtual speaker/microphone device 168 only. For example, the virtual speaker/microphone device 168 can include software that implements the functionality of external microphone 185 and external speaker 186, e.g., implements the functionality resulting from function calls exposed by the extended speakers/microphones API 150. The input API 152 allows the smart television 104 to utilize the local touch panel, keyboard device 170 and the virtual touch panel, keyboard devices 172. Additionally, the extended touch panel, keyboard APIs 154 allows the smart television to utilize the extended functionalities of virtual touch panel, keyboard devices 172 only. For example, the virtual touch panel, keyboard device 172 can include software that implements the functionality of the external keyboard 188, e.g., implements the functionality resulting from function calls exposed by the extended touch panel, keyboard APIs 154. The device manager 138 can also include other devices 174 included in the smart television 104 or external to the smart television 104. Thus, the functionality declared in the legacy APIs supports both the legacy built-in devices and the virtual devices. Additionally, the functionality declared in the extended APIs supports only the virtual devices.

The device manager 138 allows the various applications of the smart television 104 to interact with each of the devices, e.g., local or virtual, using the APIs. For example, if a user of the smart television 104 opens the video chat application 122, the device manager 138 can provide a default suggestion to use a virtual camera device 160 on the local screen 162 of the smart television 104. Alternatively, the device manager 138 may present the user with the option to use either the local camera 158 or the virtual camera device 160 through the local screen 162. The user can interact with the one or more buttons on the local screen 162 of the smart television 104 to select which camera to use. In particular, the device manager 138 can provide the option of which camera to use to the local screen 162 through the display API 144. In response to the user selecting the virtual camera 160, for example, the device manager 138 can load the corresponding hardware abstraction layer (HAL) component, e.g., virtual camera device 160, and provide the corresponding HAL component to the application framework 134 for the applications of the smart television 104 to use.

In another example, if the user of the smart television 104 opens the web browser application 128, the device manager 138 can provide an indication of whether the user prefers to use the local touch panel, keyboard device 170 of the smart television 104 or the virtual touch panel, keyboard device 172. The user can provide the selection of which keyboard to use through the local screen 162. Alternatively, the device manager 138 can provide an indication to use the virtual device 164 if the device manager 138 knows the user prefers to use the virtual screen device 164 or is already using the virtual screen device 164. The user can then select either to use the local touch panel, keyboard 170, or the virtual touch panel, keyboard 172. In response to the user selection, e.g., the selected virtual touch panel, keyboard device 172, the device manager 138 will load the virtual device 172 and provide it to the application framework 134 and to the web browser application 128 so the user can type on the virtual touch panel, keyboard device 172 to interact with the web browser application 128.

Figure 2:
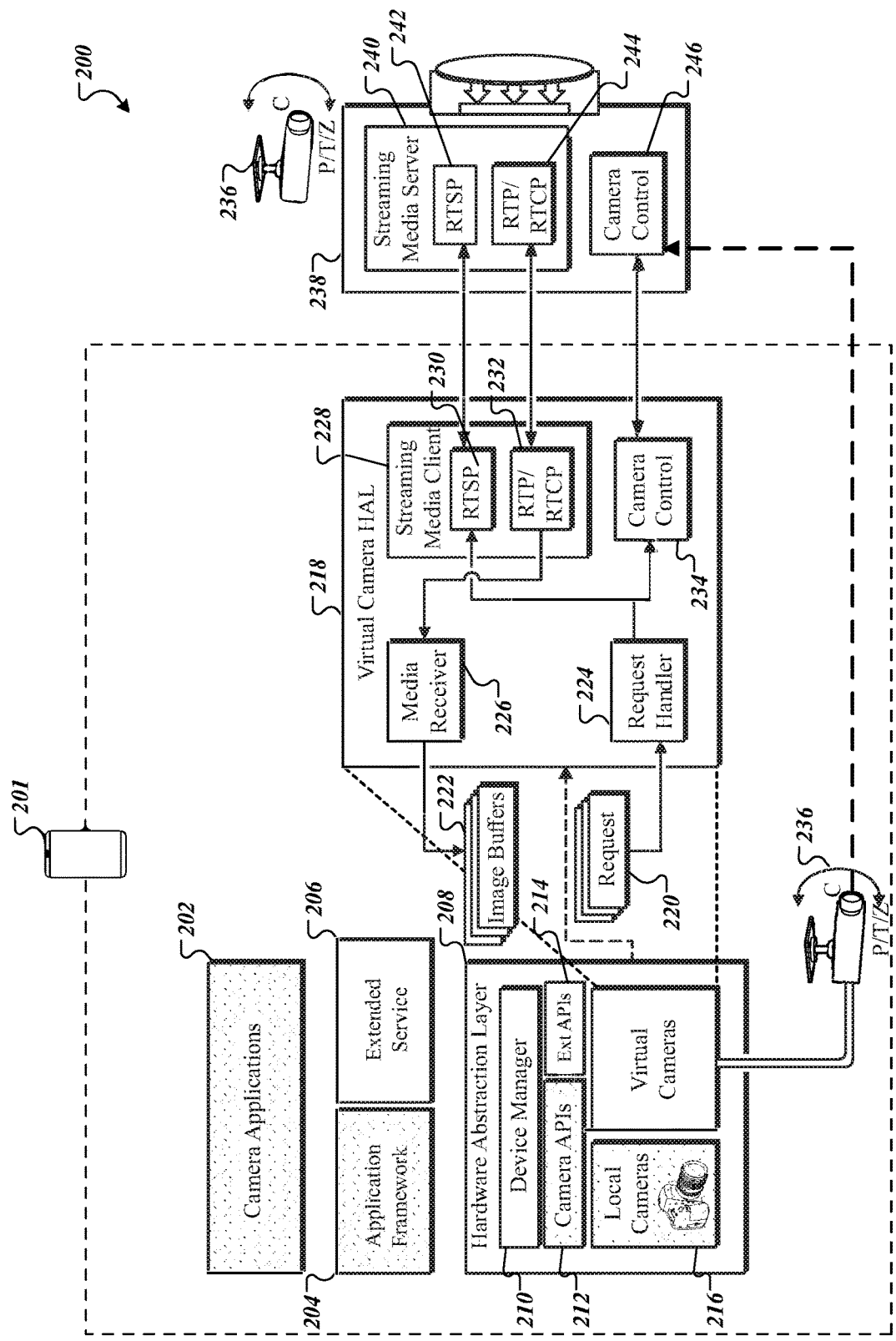
FIG. 2 is a block diagram that illustrates an example of a system for implementing with a smart device a virtual camera API corresponding to an external camera.

FIG. 2 is a block diagram that illustrates an example of a system 200 for implementing with a smart device 201 a virtual camera API corresponding to an external camera. The system 200 includes a smart device 201, an external camera 236, and internal components within the external camera 236. The smart device 201 includes camera applications 202, an application framework 204, extended service 206, a hardware abstraction layer 208, and virtual cameras hardware abstraction layer (HAL) 218. The system 200 includes similar components to system 100.

The camera applications 202 include various applications that utilize the cameras of the smart device 201. For example, the camera applications 202 can include video messaging applications, video conferencing applications, and video recording applications. The smart device 201 includes an application framework 204 that provides the framework for the camera applications 202 to interact with the operating system of the smart device 201. With the application framework 204, the camera applications 202 can also communicate with various internal and external device using APIs stored on the smart device 201.

The smart device 201 also includes an extended service 206. The extended service 206 is similar to the extended services 132 illustrated in system 100. The extended service 206 can include functionality that can be used by new applications, such as new applications 130 found in system 100.

The smart device 201 also includes the hardware abstraction layer 208. The hardware abstraction layer 208 is similar to the hardware abstraction layer 136 from system 100. In particular, the hardware abstraction layer 208 includes the camera APIs 212, extended APIs 214 local cameras 216 attached to the smart device 201, and virtual cameras hardware abstraction layer (HAL) 218. The virtual cameras 218, which will be further described below, include one or more cameras external and not physically attached to the smart device 201. For example, the system 200 includes an external camera 236, e.g., virtual camera, which the smart device 201 can use as an external camera.

The virtual camera HAL 218 includes a request handler 224, a media receiver module 226, a streaming media client 228, and camera control module 234. The request handler 224 handles requests 220 provided by the operating system of the smart device 201. The operating system of the smart device 201 generates one or more requests 220 when the camera applications 202 request for access to functionality of the virtual or external devices. The operating system then transmits the requests 220 to the virtual cameras HAL 218. The request handler 224 receives the requests 220 from the operating system and forwards the requests to the external camera 236. For example, the request handler 224 will forward the requests 220 to the external camera 236 through the camera control module 234 or the real time streaming protocol (RTSP) 230. The request handler 224 can provide requests based on the external camera's capability. For example, if the request to the external camera 236 includes functionality not currently allowed or implemented by the external camera, the request handler 224 can discard the request.

The requests 220 can include indications to adjust and set camera settings/controls for the external camera 236. Additionally, the requests 220 can include indications to capture and process recorded video from the external camera 236. For example, these requests 220 can include adjusting settings such as resolution, pixel format, and three-A modes, e.g., auto-focus, auto-exposure, and auto-while balance (3A modes). In some examples, the external camera 236 may include more functionality than the built-in camera. As a result, the virtual cameras HAL 218 will include the additional functionalities of the external cameras that the smart device 201 can utilize. For example, the external camera can include functionality not found associated with the internal camera, such as pan, tilt, and zoom functionality, that the smart device 201 can use.

The camera control module 234 can communicate with the camera control module 246 of the external camera 236. The camera control module 234 configures the external camera 236 based on the requests 220 provided by the operating system of the smart device 201. Additionally, the camera control module 234 receives acknowledgments from the camera control module 246 in response to the external camera 236 completing the requests 220.

The streaming media client 228 includes an RTSP 230 module and a real-time protocol (RTP)/real-time control protocol (RTCP) module 232. The streaming media client 228 uses the RTSP 230 as a protocol for establishing connection with the external camera 236 and providing and receiving control information to the external camera 236. For example, the control information can include an indication to play, pause, rewind, fast forward, and record media. The streaming media client 228 can also receive responses from the streaming media server 240 indicating that the requested control information has been set. The RTP/RTCP module 232 provides the ability to stream media delivery between the smart device 201 and the external camera 236.

The virtual camera HAL 218 also includes a media receiver module 226. The media receiver module 226 communicates with the RTP/RTCP module 232 to receive video and image data from the external camera 236. The media receiver module 226 also provides the image data and corresponding metadata to image buffers 222 stored on the smart device 201. The operating system of the smart device 201 typically accesses the image buffers 222 to provide media to the camera applications 202. In this case, the operating system can access either the recorded media from internal camera devices in the image buffers 222 or recorded media from external camera devices in the image buffers 222. Thus, the virtual cameras HAL 218 allows the smart device 201 to use the external or virtual cameras as if they were built-in cameras by accessing media from the same location in memory, e.g., image buffers 222.

The external camera 236 includes a streaming media server 240 and a camera control module 246. The streaming media server 240 includes an RTSP module 242 and an RTP/RTCP module 244. In particular, the RTSP module 242 on the streaming media server 240 establishes a connection between the external camera 236 and the virtual cameras HAL 218 on the smart device 201, e.g., through the RTSP 230 on the streaming media client 228. Additionally, the RTSP module 242 manages and establishes commands provided to control the functionality of the external camera 236. For example, the RTSP module 242 manages commands to control video streaming control, such as play, pause, fast forward, and rewind. The RTP/RTCP module 244 provides the video/image data recorded by the external camera 236 to the smart device 201 through the RTP/RTCP module 232. Lastly, the camera control module 246 exposes a user interface for the virtual cameras HAL 218 to allow the smart device 201 to query camera information corresponding to the external camera 236 and to control the behavior of external camera 236. For example, the camera control module 246 controls commands of the camera, such as pan, tilt, zoom ("P/T/Z" in FIG. 2), a resolution, pixel format, and the setting of at least one of the three-A modes.

Figure 3:
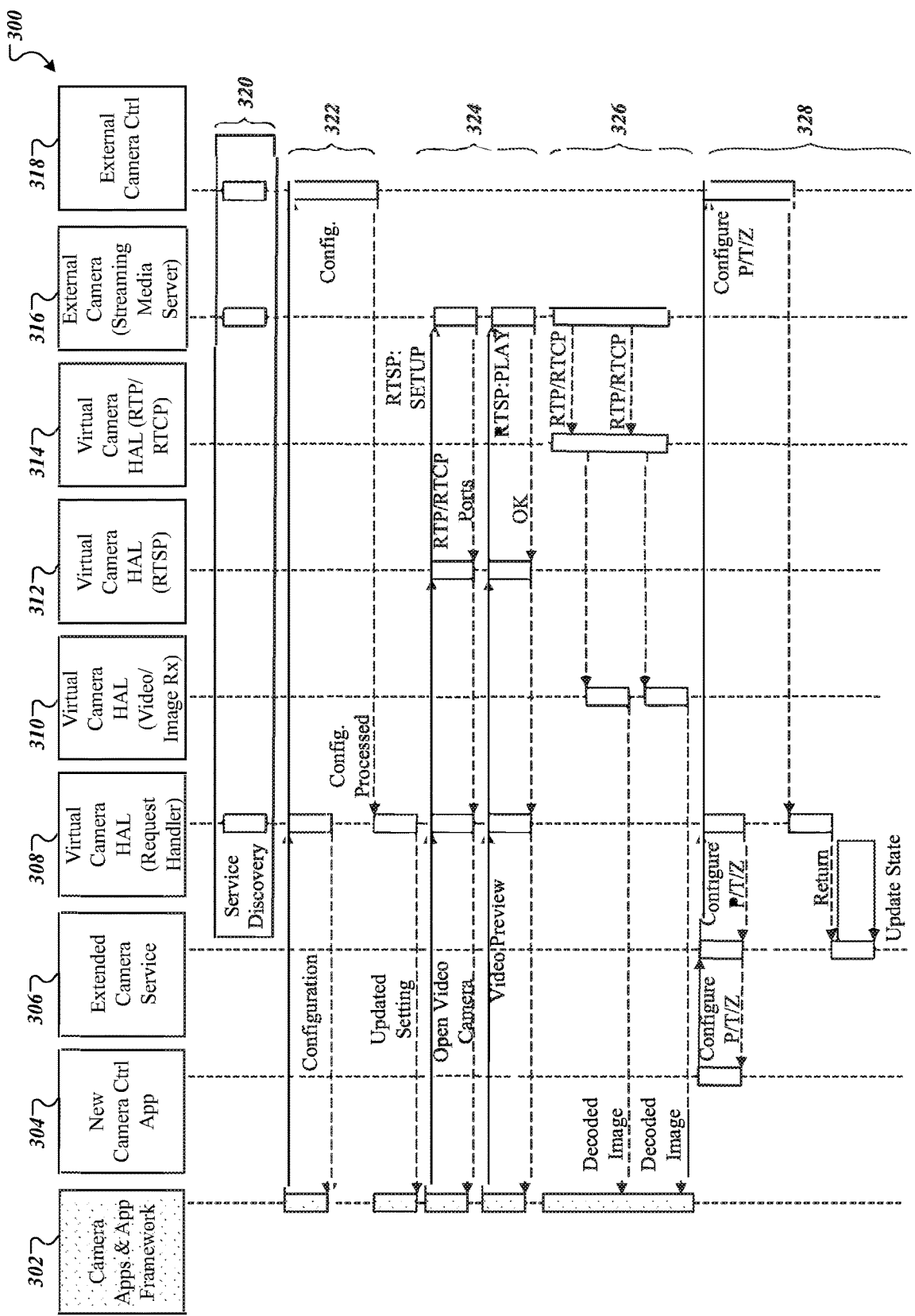
FIG. 3 is a block diagram that illustrates an example of a process for communications between a virtual camera hardware abstraction layer (HAL) and an external camera.

FIG. 3 is a block diagram that illustrates an example of a process 300 for communications between a virtual camera hardware abstraction layer (HAL) and an external camera. In particular, the process 300 illustrates communication between the following components during the setup of the virtual camera HAL communicating with the external camera. The components include camera applications and application framework 302, a new camera control application 304, an extended camera service 306, a virtual camera HAL (request handler) 308, a virtual camera HAL (video/image) receiver 310, a virtual camera HAL (RTSP) 312, a virtual camera HAL (RTP/RTCP) 314, an external camera (streaming media server) 316, and an external camera control 318. The process 300 includes similar components and performs similar functions to those of systems 200 and 100.

During 320, the virtual camera HAL (request handler) 308 determines whether an external camera exists and is within proximity to a corresponding smart device. In particular, the virtual camera HAL (request handler) 308 executes a service discovery protocol to determine whether an external camera is within proximity to the smart device. For example, the virtual camera HAL (request handler) 308 can use AllJoyn or NearBy to determine whether an external camera exists. The virtual camera HAL (request handler) 308 can determine that the external camera exists by connecting to either the external camera (streaming media server) 316 or the external camera control 318. In response to determining whether an external camera exists, the device manager can register the external camera.

During 322, in response to determining that an external camera is within proximity to the smart device, the device manager of the smart device registers the external camera with the smart device. In particular, the camera apps & application framework 302 transmits a request to the virtual camera HAL (request handler) 308. The virtual camera HAL (request handler) 308 will receive the request and configure the external camera accordingly. For example, the virtual camera HAL (request handler) 308 will transmit a configuration request to the external camera control 318 to retrieve the parameters of the external camera. The virtual camera HAL (request handler) 308 can receive the configuration parameters from the external camera control 318 and provided updated settings of the external camera control to the camera apps & application framework 302.

During 324, the camera apps & application framework 302 transmits an "OPEN VIDEO CAMERA" command to the virtual camera HAL (request handler) 308. The virtual camera HAL (request handler) 308 receives the command from the camera apps & application framework and proceeds to set up an RTP and RTCP connection to the external camera. For example, the virtual camera HAL (request handler) 308 establishes an RTSP connection with the external camera (streaming media server) 316 by transmitting an "RTSP:SETUP" command. The external camera (streaming media server) 316 returns an RTP and an RTCP port numbers to the virtual camera HAL (RTSP) 312. The virtual camera HAL (RTSP) 312 returns an acknowledgment to both the virtual camera HAL (request handler) 308 and the camera apps & application framework 302 indicating that the virtual camera HAL (RTSP) 312 has received the RTP and the RTCP port numbers.

Additionally, during 324, the camera application 302 transmits a video "VIDEO PREVIEW" command to request that the external camera 308 initiate streaming content. For example, the camera apps and application framework 302 will transmit a video preview command to the virtual camera HAL (request handler) 308. In response, the virtual camera HAL (request handler) 308 will forward the video preview command to the virtual camera HAL (RTSP) 312, which will subsequently issue an RTSP:PLAY command to the external camera (streaming media server) 316. The external camera (streaming media server) 316 can execute the "PLAY" command and provide back an "OK" response to the virtual camera HAL (RTSP) 312, which will subsequently forward the OK command to the virtual camera HAL (request handler) 308. The virtual camera HAL (request handler) 308 can indicate to the camera apps & application framework 302 that the "VIDEO PREVIEW" command was successfully received and executed.

During 326, the external camera (streaming media server) 316 provides media to the virtual camera HAL (RTP/RTCP) 314. The external camera (streaming media server) 316 provides the media data over the RTP/RTCP protocol to the virtual camera HAL (RTP/RTCP) 314. In response, the virtual camera HAL (RTP/RTCP) 314 forwards the media to the virtual camera HAL (video/image) receiver 310. The virtual camera HAL (video/image) receiver 310 will receive the media data, decode the media data, process the media data, and provide the decoded media to the camera application and application framework 302 for the smart device to utilize. A user or application can then interact with the decoded media.

During 328, the new camera control applications 304 can use functions provided by the extended services to use the newly added APIs. For example, the new camera control application 304 can work with the extended camera service 306 to transmit pan/tilt/zoom commands to the virtual camera HAL (request handler) 308. The new camera control application 304 can transmit a notification to the extended camera service 306 to execute a pan command, for example, and the extended camera service 306 can generate a specific command for panning to provide to the virtual camera HAL (request handler) 308. The virtual camera HAL (request handler) 308 can transmit this specific panning command to the external camera control 318. In response, the external camera control 318 can provide a "Configuration Processed" message back to the virtual camera HAL (request handler) 308 to indicate that the external camera has been adjusted, e.g., panned, based on the request. The virtual camera HAL (request handler) 308 can then indicate to the camera application and application framework 302 that the setting has been adjusted.

Figure 4:
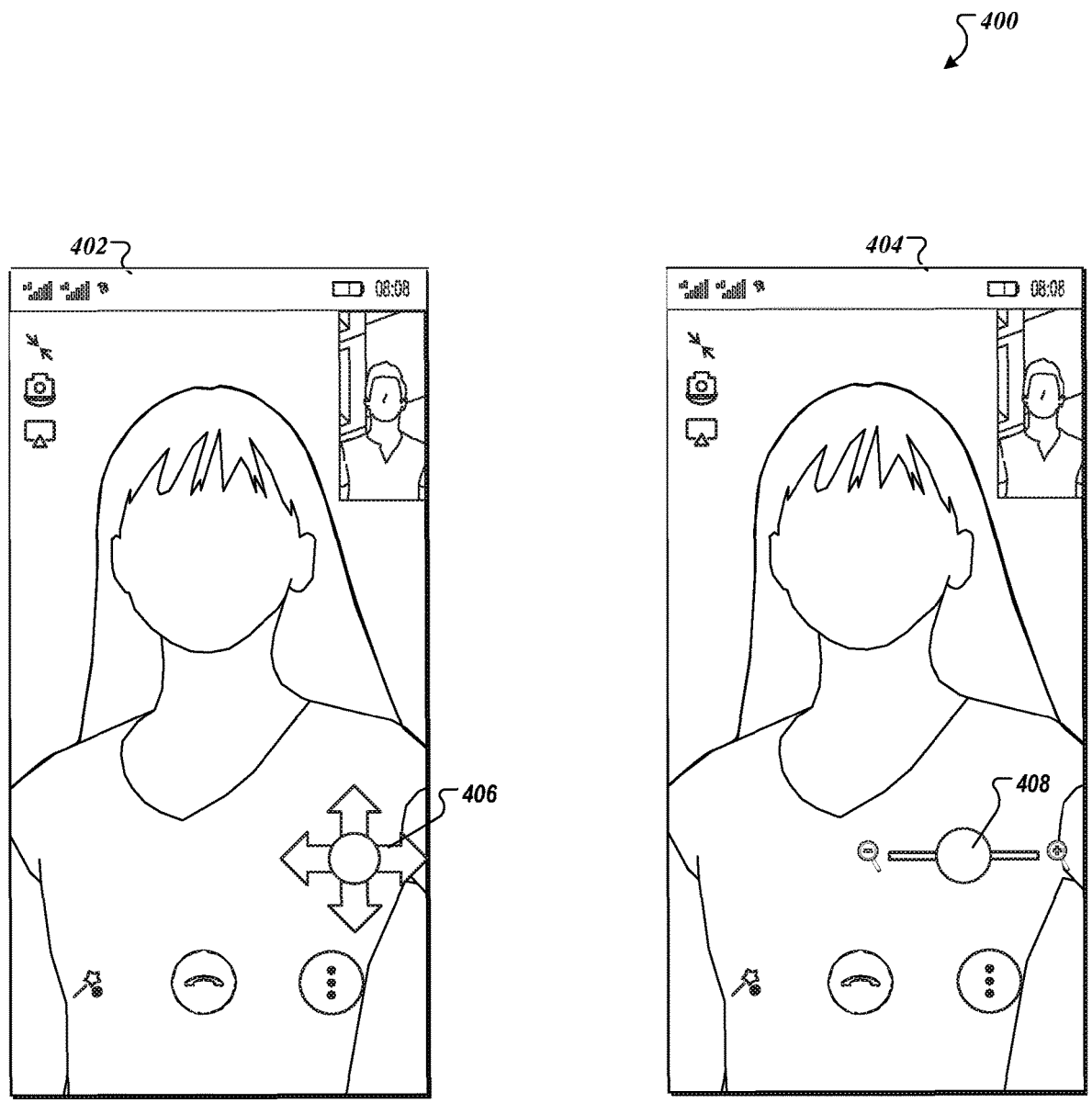
FIG. 4 is a block diagram that illustrates an example of a system showing legacy applications using hardware abstraction layer APIs.

FIG. 4 is a block diagram that illustrates an example of a system 400 showing legacy applications using hardware abstraction layer APIs. For example, the system 400 illustrates an application in two different states, e.g., first state 402 and second state 404, using new functionality from an external device. For example, the first state 402 illustrates the application enabling the user to control panning and tilting of an associated camera. The second state 404 illustrates the application enabling the user to zoom in or out with an associated camera. For example, the legacy application can use existing HAL APIs to work with virtual device. However, in order to allow the user to select new functionality from external device, two options exist. First, the legacy application is not modified, but rather, a new application is added. For example, in order to support the functionality of pan, tilt, and zoom functionality in a video chatting application, such as SKYPE, a floating button could be launched on a particular application. Pressing and moving the floating buttons can control camera in pan/tilt mode, e.g., up, down, left and right. The floating button 406 illustrates the supporting functionality of pan and tilt functionality. If the user presses on the floating button 406 for a long period of time without moving his/her finger, e.g., 3 seconds, the floating button 406 will switch to floating button 408. The floating button 408 allows the user to perform a zoom mode. In particular, the floating button 408 will allow the user to zoom the camera out by sliding a slider of floating button 408 to the left and the floating button 408 will allow the user to zoom the camera in by sliding the slider of floating button 410 to the right. In some implementations, each of the floating buttons, e.g., 406 and 408, are standalone applications that operate outside of the video chatting application.

Figure 5:
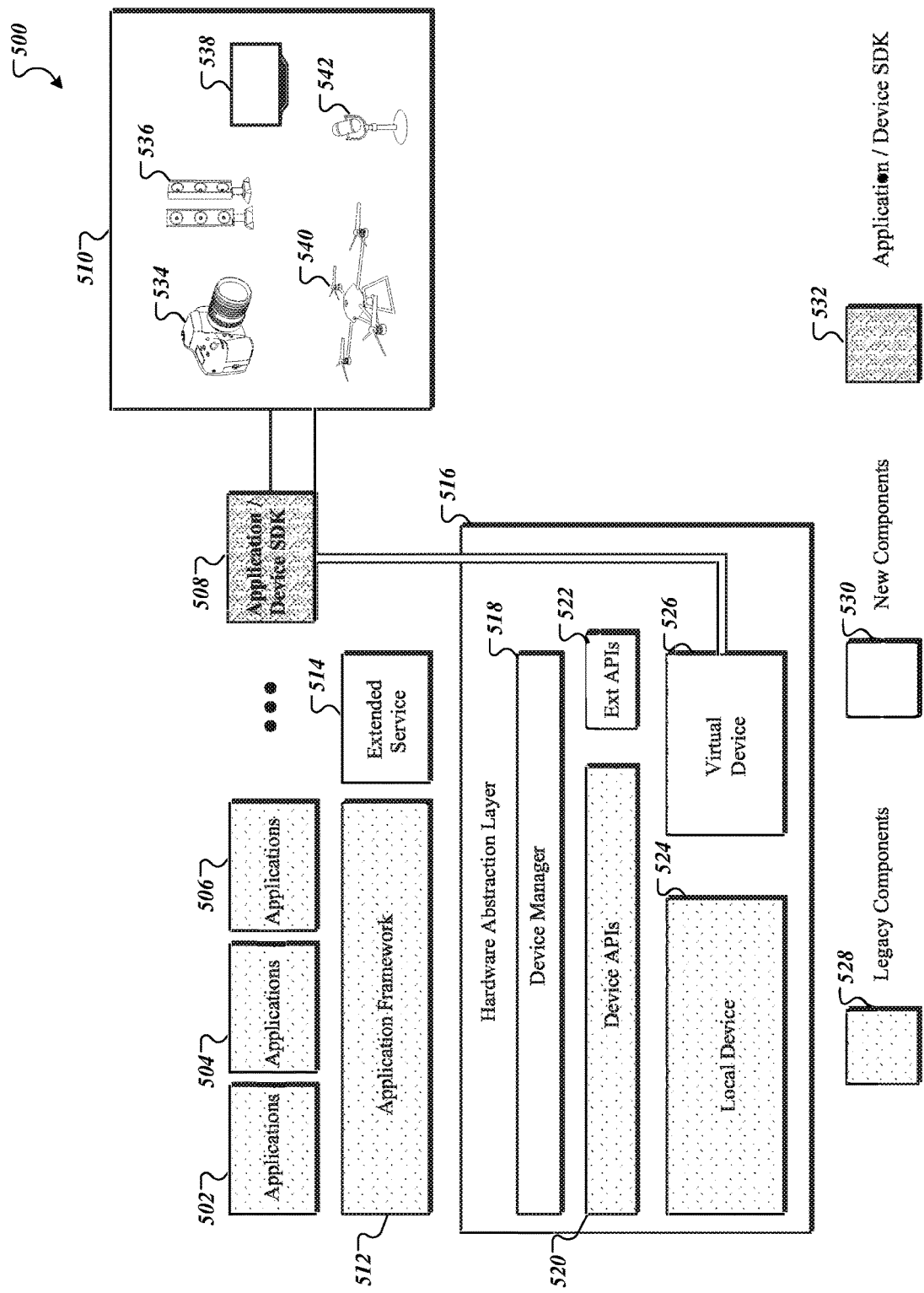
FIG. 5 is a block diagram that illustrates an example of system for implementing a virtual device corresponding to an external camera with a smart device.

FIG. 5 is a block diagram that illustrates an example of system 500 for implementing a virtual device corresponding to an external camera 534 with a smart device. The system 500 includes similar components and performs similar functions to systems 100 and 200 and process 300. For example, the system 500 can illustrate the components within a client device, such as a smart television. The system 500 illustrates a legend showing legacy components 528, new components 530, and application/device SDK components 532.

The system 500 includes applications 502, 504, and 506 and an application/device software development kit (SDK) 508. Applications 502, 504, 506, can include, for example, web chatting application, video chatting applications, and video game applications. The application/device SDK 508 can include software for managing external devices and provide application programmable interface (API) for third parties to use their devices. The system 500 can also include an application framework 512 and an extended service 514. The application frame 512 and the extended service 514 are similar to application frame 204 and extended service 206 from system 200. Additionally, the hardware abstraction layer 516 is similar to the hardware abstraction layer 136, the device manager 518 is similar to device manager 138, and the device APIs 520 and external APIs 522 are similar to the local APIs 140, 144, 148, and 152 and the external APIs 142, 146, 150, and 154, respectively.

In some implementations, the local device 524 corresponds one or more built-in devices. For example, the local device 524 can include a device, such as a camera, a display, or a speaker. The virtual device 526 can include one or more devices that are connected to the smart television, such as an external camera, external speakers, an external television, a drone, a smart lock, or a microphone.

As illustrated in the system 500, the virtual device 526 can connect to various external devices 510 through the application/device SDK 508. For example, the various external devices 510 can include an external camera 534, external speakers 536, an external television 538, a drone 540, and an external microphone 542. The virtual device 526 can also be implemented based on the application/device SDK 508. For example, a virtual camera HAL within the virtual device 526 can be implemented based on a drone 540's SDK, such that, legacy applications on the smart television in system 500 can take video or pictures from the drone 540 flying. Thus, the connection and data exchanged with external devices are controlled and maintained by the application/device SDK 508. The virtual device 526 can invoke APIs of the application/device SDK 508 to implement the virtual camera HAL requirement.

Figure 6:
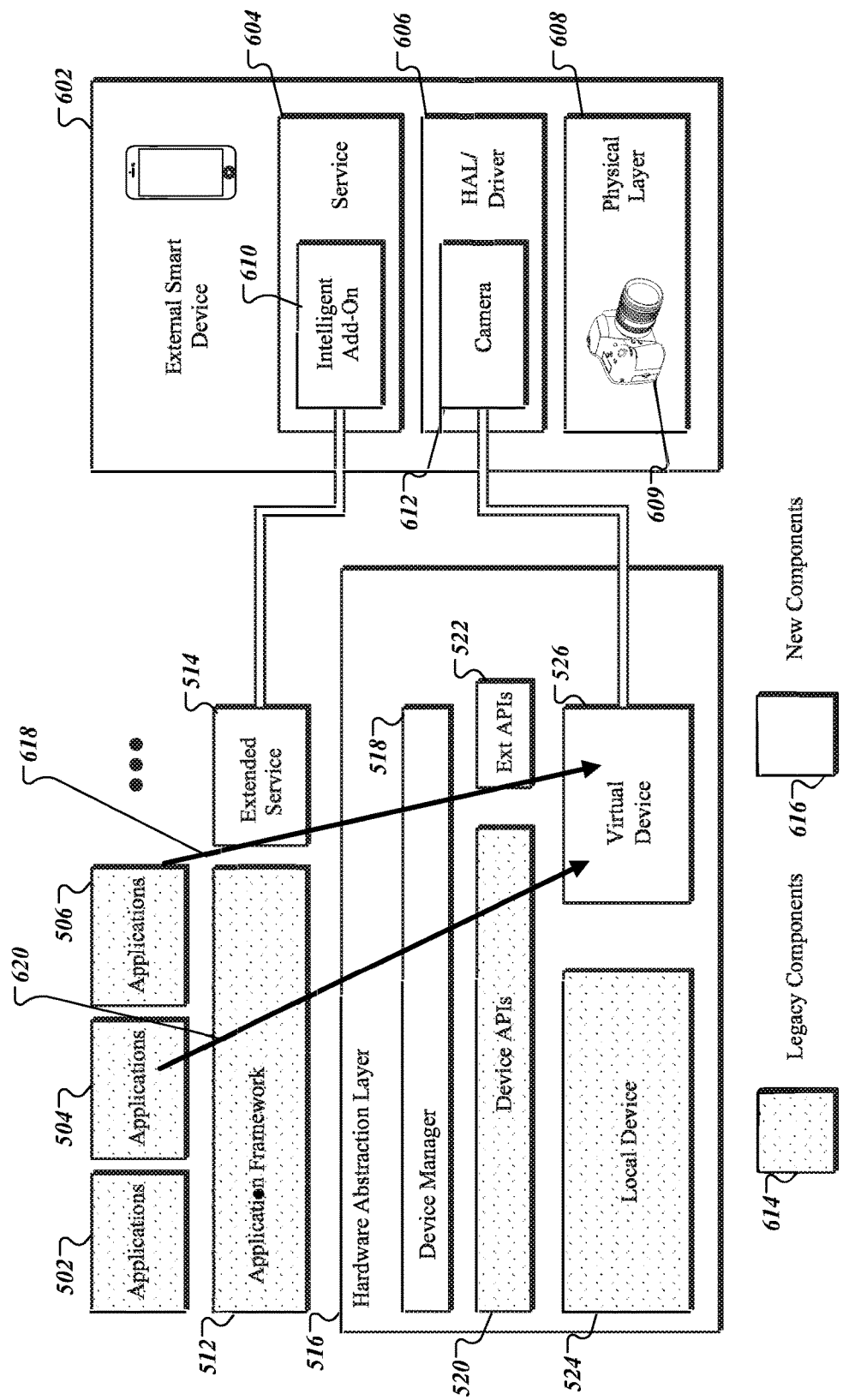
FIG. 6 is a block diagram that illustrates an example of system for implementing a virtual device corresponding to an external camera with a smart device.

FIG. 6 is a block diagram that illustrates an example of system for implementing a virtual device corresponding to an external camera with a smart device. FIG. 6 illustrates similar components to those components shown in system 500. The repeated components between FIG. 5 and FIG. 6 will not described in this section. The new components will be described below.

FIG. 6 illustrates a smart device 602 connected to the extended service 514 and virtual device 526 within the hardware abstraction layer 516 of a particular client device. The smart device 602 includes a service layer 604, a hardware abstraction layer (HAL)/driver layer 606, and a physical layer 608. The service layer 604, the HAL/driver layer 606, and the physical layer 608 are similar to the service layer 106, the driver layer 108, and the physical layer 110, respectively. The service layer 604 includes intelligent add-on software 610. The HAL/driver layer 606 includes a driver for each component and external to the smart device 602, such as, for example the camera driver 612. The camera driver 612 can be implemented as virtual device 526 on the hardware abstraction layer 516 of the corresponding client device. The physical layer 608 includes bit and byte level communications between physical and virtual devices of the smart device 602. For example, the physical layer 608 can include a built-in camera 609.

The smart device 602 can be a smart and powerful device that can export basic device functionalities as well as add-on services to the extended service 514 and the virtual device 526. For example, the smart device 602's add-on service is extended as a local service to the extended service 514. For example, the smart phone 602's camera driver 612 can be exported to the smart television as a virtual camera device 526. Additionally, the smart phone 602's facial recognition algorithm can be exported to the smart television, so that the smart television includes an "intelligent camera" that can perform facial recognition. Additionally, because the virtual camera has implemented camera HAL API, the smart television's other intelligent algorithm, e.g., facial recognition, can invoke virtual camera functions, such as, zoom, pan, tilt, and record, to name a few examples.

In some implementations, FIG. 6 illustrates legacy function calls and new functions calls associated with the smart device. For example, applications 506 can make a new function call 618 through the extended APIs 522 to the virtual device 526. Additionally, applications 504 can make a legacy function call 620 through the device APIs 520 to the virtual device 526. The virtual device 526 can receive and perform both the legacy function calls 620 and the new function calls 618.

Figure 7:
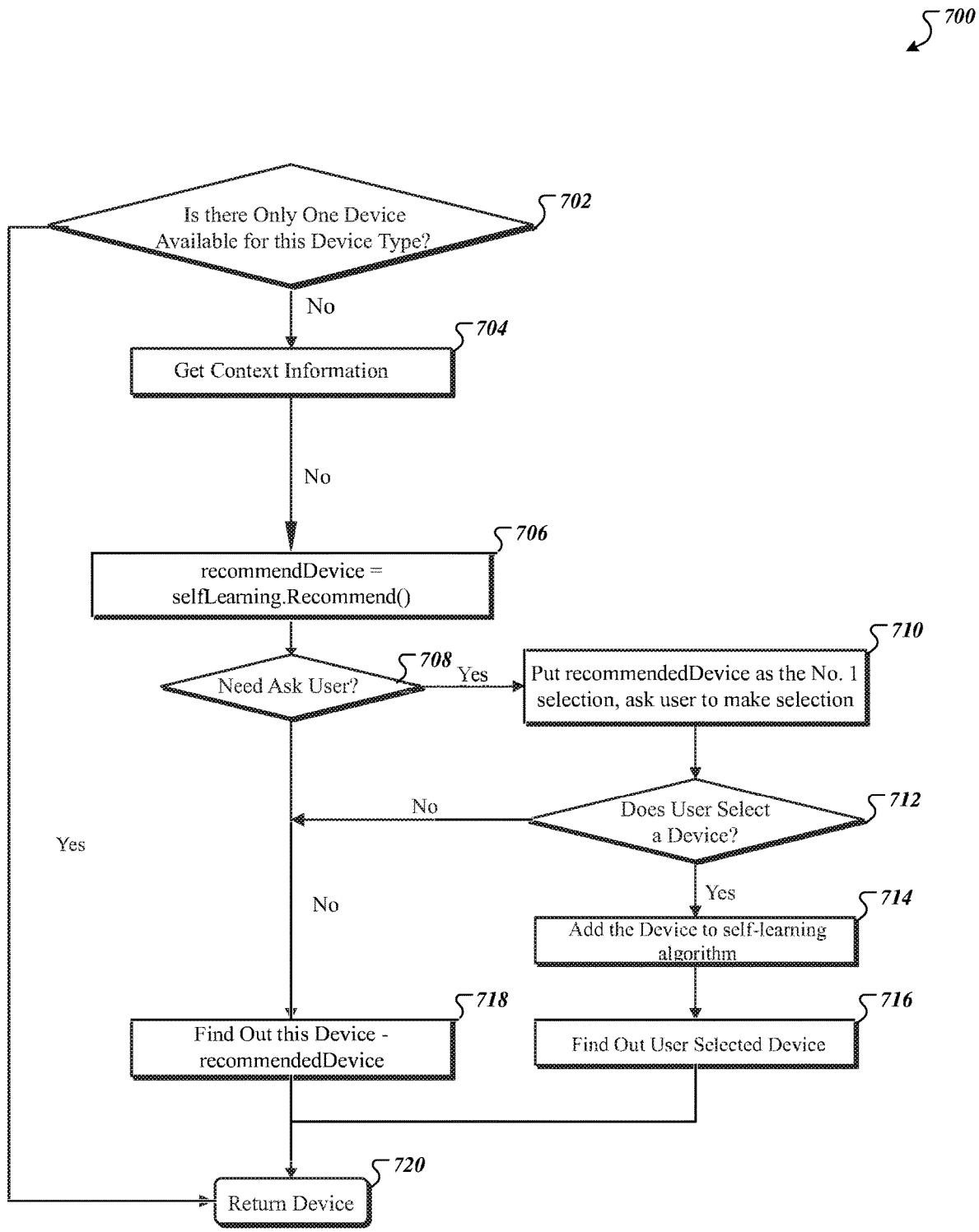
FIG. 7 is a flow diagram that illustrates an example of a process for selecting a device to use in a smart device.

FIG. 7 is a flow diagram that illustrates an example of a process 700 for selecting a device to use in a smart device. The process 700 is implemented by the device manager of the smart device, such as device manager 138 in system 100. In particular, the device manager invokes the "ChooseDevice" function based on a device type and an application type launched in process 700. For example, if a user opens a video chat on the smart device, the "ChooseDevice" function will be invoked for each type of the devices, such as, the display, the camera, the speaker, and microphone. For example, the "ChooseDevice" function will determine whether to incorporate external components and internal components for each of the display, the camera, the speaker, and the microphone of the smart device.

In some implementations, the device manager performs a variety of functions on the smart device. In particular, the device manager manages both the list of built-in and virtual devices. Upon booting of the smart device, the device manager will scan each of the built-in devices on the smart devices and retrieve methods for the virtual devices to (i) register and (ii) unregister from the virtual camera hardware abstraction layer (HAL). The device manager can also manage user preferences for the built-in and virtual devices.

The user preferences for the built-in and virtual devices are based on a rule-based preference system. For example, a user can choose which device to be used for a particular application his or her smart device based on context. The context can include applications currently executing on the client device, a location of the user, a location of the user's client device, and a current time. The location of the user can be different from the location of the user's client device. For example, the user may be located in his/her vehicle while the user's client device is located at his or her residence.

The device manager can also use self-learning to improve the overall user experience with the smart device. To do so, the device manager can learn and establish rules for different context based on user's previous selections of built-in and external devices, device capability, and location of the smart device. Based on establishing rules for device capability, the device manager can provide a recommendation to the user as to which device is to be used in the current situation. The device manager will list each of the current available devices based on the types of the device. For example, the device manager lists a speaker list, a camera list, and a heartbeat monitor list. In addition, the device manager places the recommended device at the front of the list. The user can then select one of the devices from the list provided by the device manager to use and the device manager can receive the user's selection. The device manager can then update the self-learning algorithm to make better predictions for which devices should be recommended to the user based on context. In some examples, if the user selects one of the recommended devices, the device manager labels the recommended device with the highest priority for subsequent recommendations. In some instances, the generated recommendation may be used as an initial or default setting for the situation without further input, but could be changed after its initial usage/selection.

In some implementations, the device manager determines whether one device is available for the smart device to use (702). In particular, the device manager scans the smart device to determine a number of built-in and external devices that a user can use for a particular application. For example, the device manager can determine a number of built-in cameras that are included within the smart device and a number of external cameras that are located within proximity to the smart device. In this example, the device manager can determine that the smart device includes one built-in camera and is within proximity to one external camera.

If the device manager determines that only one built-in device exists and no external device is found, the process moves to 720, where the device manager selects the one built-in device to use at the smart device. Afterwards, the process ends.

Alternatively, if the device manager determines more than one devices are located within proximity to the smart device, e.g., one built-in camera, one external camera, then the process 700 moves to 704.

The device manager determines context information of the smart device (704). For example, the context information can include the number of applications executing on the smart device. For example, the device manager can determine that a messenger application, a video chatting application, and a multiplayer game application are all currently executing on the smart device. Additional context information can include a location of the user associated with the smart device. The location of the user associated with the smart device can correspond to the location of the smart device. Alternatively, the location of the user associated with the smart device can correspond to a location different from the location of the smart device. For example, the user can be located in his/her vehicle while his smart device is left at his/her residence. In another example, the user may have a smart watch and a smart phone. The smart watch, which may be attached to the user, can indicate that the user is at work, while the smart phone is located at the user's residence. GPS coordinates provided by the smart device, e.g., smart watch, smart phone, or smart television, may determine the location, for example.

The device manager generates a device recommendation based on the context information (706). In particular, the learning algorithm provides a device recommendation to use based on the context information. As mentioned, the context information can include the applications currently executing on the smart device, a current location of the user, a current location of the smart device if different from the current location of the user, and a current time. The device recommendation provided by the learning algorithm can include one device located within proximity to the smart device that the user can utilize for the applications currently executing. For example, the learning algorithm can provide a smart watch as recommended device for the smart device to use since the smart device currently has a health application executing.

The device manager determines whether to ask the user to confirm whether this is the recommended device or to choose another recommended device (708). In particular, the device manager determines if the user has already set a rule to use this device in this context. If the device manager determines the user has already set a device to use in this particular context, then the device manager does not need to confirm with the user. Alternatively, if new devices are found within proximity to the smart device or a new context is found, e.g., new application, a new location, a new time slot, or the context information is incomplete, and then the device manager needs to prompt the user with the selection.

If the device manager does not need to confirm the recommended device with the user, then in 718, then the device manager sets the recommended device as the device for the smart device to use.

If the device manager does need to confirm the recommended device to the user, then the device manager sets the recommended device as the first device in current available device list and provides the list to the display of the client device in 710. The device manager asks the user to make a selection of which device to use.

The device manager determines whether the user selected a particular device from the display (712). If the user did not select one of the recommended devices, then in 720, the device manager sets the recommended device as the device to use in the smart device. If the user did select one of the recommended devices, then in 714, the device manager adds the selected recommended device to the self-learning algorithm. The self-learning algorithm will update and prioritize the newly selected recommended device based on the current context information.

During 716, the device manager determines the device object. In some examples, the device manager determines device register information corresponding to the particular device. In particular, 716 is similar to 718.

Then, during 720, the device manager returns data of the newly selected device to the smart device to access the newly selected device with currently executing applications.

Figure 8:
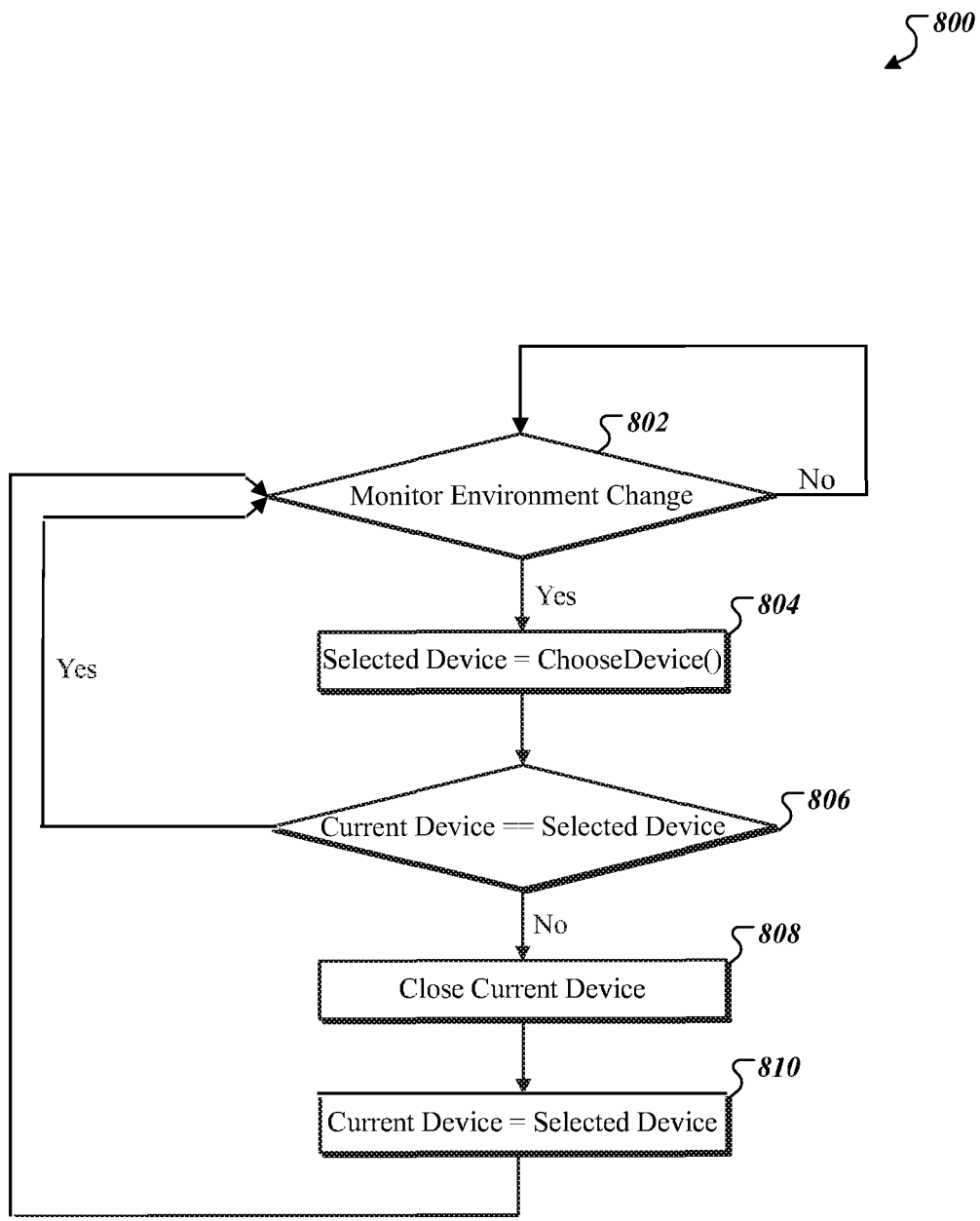
FIG. 8 is a flow diagram that illustrates an example of a hand over device process for use in a smart device.

FIG. 8 is a flow diagram that illustrates an example of a hand over device process 800 for use in a smart device. The process 800 is implemented by the device manager of the smart device, such as device manager 138. The device manager can determine, from the APIs, the built-in and external devices utilized by the applications of the smart device.

The device manager monitors an environment change of the smart device (802). In particular, the device manager determines whether the smart device has changed environments. The change in environment can include, for example, a change in location, a change in context, or whether new devices have been added to or removed from the environment in proximity to the smart device. Other environmental changes can be detected and/or determined in other instances. The device manager also determines whether a context change has occurred, a new device has registered, or a device has un-registered. If the device manager determines a change in the environment has occurred then the device manager proceeds to 804.

The device manager will execute the ChooseDevice function and set the output as the selected device (804). In particular, the process 700 describes the flow and processes that occur during the execution of the ChooseDevice function.

The device manager will determine if the "Selected Device" is equal to the "Current Device" (806). If these two devices are equal, then the process returns to 802 where the device manager monitors the environment change. If the two devices are not equal, then the process proceeds to 808 to close the current device. Closing the current device indicates that the device manager disconnects the application executing to the corresponding device API and closes the particular device. Then, the device manager sets the selected device equal to the current device (810). If the newly selected device is an external device, the device manager will transmit a request to open the external device for example, establish the RTSP and RTP/RTCP connection for external camera (810).

Figure 9:
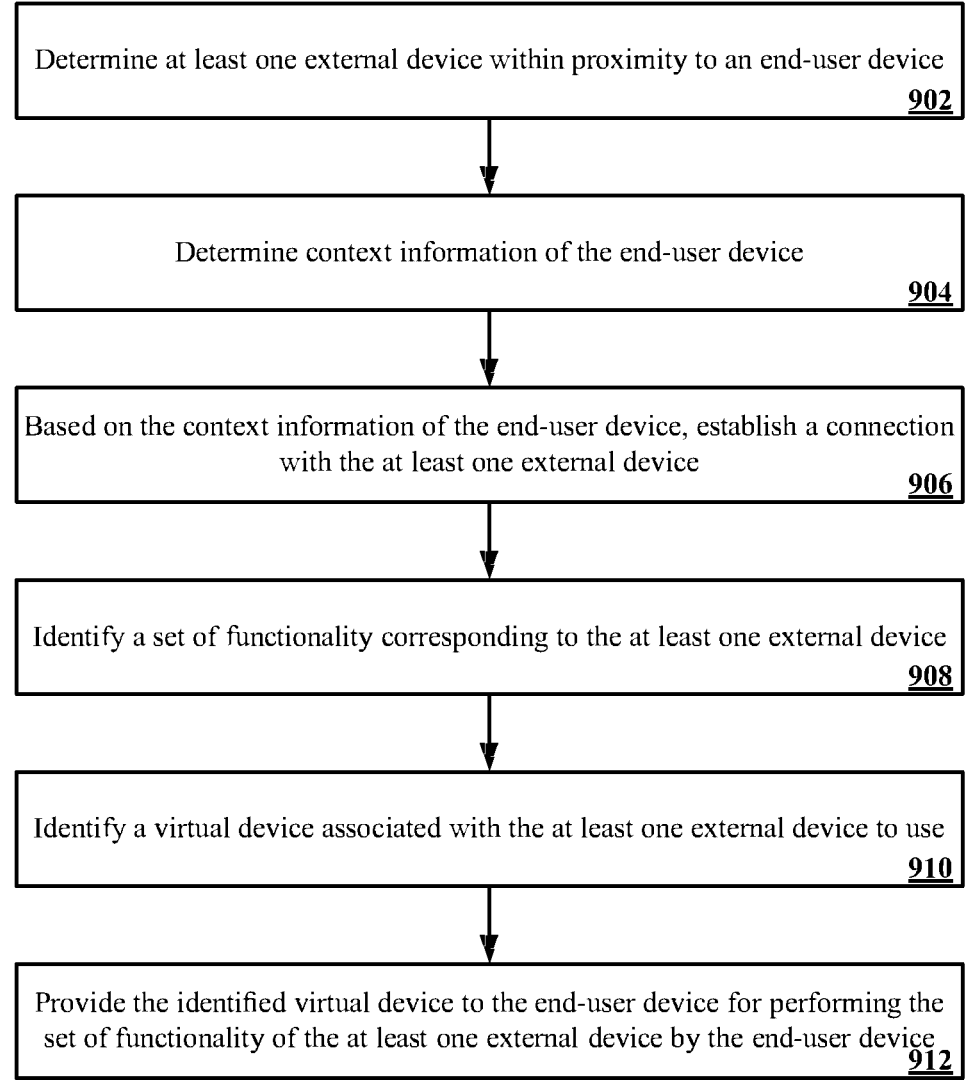
FIG. 9 is a flow diagram that illustrates an example of a process for integrating an API of one or more external devices into a smart device.

FIG. 9 is a flow diagram that illustrates an example of a process 900 for integrating an API of one or more external devices into a smart device. The process 900 includes determining at least one external device within proximity to an end-user device; determining context information of the end-user device; based on the context information of the end-user device, establishing a connection with the at least one external device; identifying, by the device manager, a set of functionality corresponding to the at least one external device; identifying, by the device manager, a virtual device associated with the at least one external device to use; and providing the identified virtual device to the end-user device for performing the set of functionality of the at least one external device by the end-user device. The process 900 can be performed by the device manager 138 of system 100.

The device manager determines at least one external device within proximity to an end-user device (902). In particular, the device manager can determine that a speaker system, a smart watch, a smart television, a microphone, a heart rate monitor, or an automotive head unit from a vehicle, to name a few examples, are located within proximity to the end-user device. The device manager can use one or more protocols, such as AllJoyn, NearBy, or other communication protocols, to determine what devices exist within proximity to the end-user device.

The device manager determines context information of the end-user device (904). The context information can include one or more applications on the end-user device, one or more applications currently executing on the end-user device, a location of the user, a location of the end-user device, and a current time. Also, the context information can include data describing characteristics of the end-user device. The characteristics can include a make and model of the end-user device, hardware and software specifications of the end-user device, an operating system currently executing on the end-user device, and a current set of APIs located on the end-user device.

Based on the context information of the end-user device, the device manager establishes a connection with the at least one external device (906). The device manager utilizes the rule based preference system based on the determined context information to determine whether to connect to the at least on external device. In particular, the device manager utilizes a self-learning capability in which different rules are established based on the context information. If a device that is detected has been previously detected before and the user has selected that device to be used in this context, then the latest device has the highest priority to be recommended. Alternatively, if the user has not made a choice for this recommendation in this context, then the most powerful device has the highest priority to be recommended. The user may select the recommended device to connect to or the device manager may automatically connect to the recommended device. The device manager then establishes the connection with the at least one recommended external device over a communication protocol, such as an RTSP setup connection and an RTP/RTCP media streaming connection. For example, the device manager recommends an external camera to connect with the user's smart device.

In some implementations, the device manager can determine that the end-user device can benefit from using the functionality provided by the at least one external device. In particular, if the device manager determines that an application on the end-user device requires the use of particular functionality not currently found in the smart user device, then the device manager can determine whether this functionality exists in any of the functions provided by the external device. The device manager can setup a connection with the external device to identify a virtual device for the application to utilize the functions of the external device. For example, an application on the smart device may request for panning, tilting, and zoom functionality from the camera. If the built-in camera does not include this functionality, the device manager can determine if the external camera includes this additional functionality. If the external camera does include this functionality, then the device manager can identify a virtual device for the external camera. Thus, when the application transmits a request to the device manager requesting that the camera zoom in or tilts, the device manager can rely upon the functionality provided by the external camera to zoom in or tilt the external camera while recording video.

The device manager identifies a set of functionality corresponding to the at least one external device (908). In particular, the device manager determines that the external device has a variety of functions that can be utilized in the smart device. The device manager can provide control information to the external device. The control information can instruct the external device to provide its function definitions and characteristics related to the external device. The external device can return device specification that include functions of the external device, services of the functions, protocols required by the functions, APIs corresponding to the functions, and a quality of media data. In the case the external device is an external camera, the device manager can determine that the external camera includes the functions of recording, pausing, playing, fast forwarding, rewinding, and skipping of the video footage. Additionally, the external camera includes the functions of panning, tilting, zooming in, and zooming out with the camera lens. The protocols can include RTP/RTSP and the quality of the media data can include 720p, 1080p, or 2160p, to name a few examples.

The device manager identifies a virtual device associated with the at least one external device to use (910). In particular, the device manager identifies the virtual device associated with the at least one external device that can be utilized by the smart device from communicating other external devices. For example, the device manager identifies the virtual device for the external camera by retrieving the virtual device from the external camera. In this manner, the smart device can utilize the external camera and its functionality as if the external camera was physically built into the smart device. The identified virtual device allows an application on the smart device to utilize any of the functions of the external camera, such as recording, pausing, playing, fast forwarding, rewinding, and skipping of the video footage. In some implementations, the device manager can retrieve an external API corresponding to the identified virtual device from a database. Functions from the external API corresponding to the identified virtual device can be exposed to the smart device and its applications as well as to other external devices. The database includes external APIs retrieved from previously established connections between the smart device and one or more external devices. The database can also contain other virtual devices that were retrieved from the previously established connections for faster retrieval.

The device manager provides the identified virtual device to the end-user device for performing the set of functionality of the at least one external device by the end-user device (912). The device manager can include the virtual device associated with the at least one external device, e.g., the external camera, with other virtual device and APIs for the built-in devices. The applications of the smart device can interact with and call upon the virtual devices to utilize the functions of the external camera. For example, a video messenger application on the smart device can use either the built-in camera of the smart device or the external camera located within proximity to the smart device.

In some examples, a user will have the option to select with camera to use for the video messenger application, e.g., built-in or external camera. In some examples, the device manager will automatically provide the external camera to be used by the video messenger application based on the determined context of the smart device.

In some implementations, the device manager can provide recommendations of external devices for the end-user associated with the end-user device to connect to be based on preferences associated with the end-user device. In particular, the preferences can include previous selections of functionality from previously selected external devices, applications currently executing on the end-user device, capabilities corresponding to the end-user device, a location of the end-user device, and a usage time of the end-user device combined with application currently executing on the end-user device. For example, the device manager will provide recommendations to connect to the external camera if the user previously selected the external camera and selected the zoom-in functionality ten times upon previously using the functionality of the external camera. Additionally, the device manager can provide a recommendation to connect to a smart watch if the smart device is currently executing a health application to retrieve health information, e.g., heart-rate of a user, and the smart watch is currently attached and monitoring the user.

The device manager can also provide recommendations of external devices to connect to based on predicted likelihoods. In particular, the device manager can generate predicted likelihoods of external device recommendations that the user is likely to connect to based on context information and preferences associated with the user and the end-user device. The generated predicted likelihoods can include statistical likelihoods and percentages that indicate the end-user device is likely to connect to one or more external devices. Based on the predicted likelihoods, the device manager can rank the external devices. The device manager can rank the external devices in ascending or descending order. Then, the device manager can provide the ranked external device recommendations to the end-user device for the user to select. In some examples, the user may be unaware the external device recommendations are ranked. In some examples, the user is aware of the ranking of the external device recommendations, as the rankings are illustrated on the display.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method performed by a device manager, the method comprising:
   selecting an external device of at least one external device within proximity to an end-user device, the device manager in a hardware abstraction layer (HAL) of the end-user device;
   determining context information of the end-user device;
   establishing a connection with the selected external device based on the context information of the end-user device;
   identifying functionality corresponding to the selected external device;
   identifying a virtual device associated with the selected external device, the virtual device being in the HAL of the end-user device, the virtual device being different from the device manager in the HAL; and
   providing the virtual device in the HAL to at least one application at an application layer of the end-user device such that the virtual device used by the at least one application performs the functionality corresponding to the selected external device as if the selected external device were built-in to the end-user device.

2. The computer-implemented method of claim 1, wherein the selected external device comprises a camera, a television, a microphone, a smart watch, a heart rate monitor, an automotive head unit from a vehicle, a drone, a smart lock, or other smart device whose service is accessible to the end-user device.

3. The computer-implemented method of claim 1, wherein the identifying the functionality corresponding to the selected external device further comprises:
   obtaining, by the device manager from the selected external device, a set of functions corresponding to the selected external device.

4. The computer-implemented method of claim 1, wherein the determining the context information of the end-user device further comprises determining, by the device manager, each of:
   a location of the end-user device;
   one or more applications on the end-user device; and
   characteristics of a type of the end-user device.

5. The computer-implemented method of claim 4, wherein the determining the context information of the end-user device further comprises:
   determining at least one function provided by the selected external device not currently available to the one or more applications on the end-user device; and
   receiving requests from the one or more applications on the end-user device to access the at least one function provided by the selected external device.

6. The computer-implemented method of claim 1, wherein the identifying the virtual device associated with the selected external device comprises:
   providing control information to the selected external device to control the selected external device;
   receiving at least one device specification corresponding to the selected external device, wherein the at least one device specification comprises at least one of:

a type of a function provided by the selected external device;
services of the function;
protocols of the function;
APIs of the function; or
quality of media data provided by the function; and
storing, by the device manager in a database, the virtual device for the selected external device, wherein functions corresponding to the virtual device are made available for use by the end-user device and to other external devices for use.

7. The computer-implemented method of claim 1, further comprising:
providing, to the end-user device, recommendations of the at least one external device within the proximity to the end-user device based on preferences associated with the end-user device, wherein the preferences are based on at least one of: previous selections of the functionality from the selected external device, applications currently executing on the end-user device, a capability of the end-user device, a location of the end-user device, or a usage time of the end-user device combined with the applications currently executing on the end-user device.

8. The computer-implemented method of claim 7, wherein the providing the recommendations of the at least one external device within the proximity to the end-user device further comprises:
generating predicted likelihoods of external device recommendations based on the preferences associated with the end-user device;
ranking the external device recommendations based on the predicted likelihoods; and
providing to the end-user device the ranked external device recommendations.

9. The computer-implemented method of claim 1, the identifying the virtual device comprising:
providing control information to the external device to control the external device;
receiving a device specification corresponding to the external device, wherein the device specification comprises a type of a function provided by the external device, services of the function, protocols of the function, APIs of the function, and quality of media data provided by the function; and
storing, in a database, the virtual device, wherein functions corresponding to the virtual device are made available for use by the end-user device and to other external devices for use.

10. A system comprising:
one or more processors; and
one or more storage devices storing instructions that are operable, when executed by the one or more processors, to cause a device manager in a hardware abstraction layer (HAL) of an end-user device running on the one or more processors to perform operations comprising:
selecting an external device of at least one external device within proximity to the end-user device including the system;
determining context information of the end-user device;
establishing a connection with the selected external device based on the context information of the end-user device;
identifying functionality corresponding to the selected external device;
identifying a virtual device associated with the selected external device, the virtual device being in the HAL of the end-user device, the virtual device being different from the device manager in the HAL; and
providing the virtual device in the HAL to at least one application at an application layer of the end-user device such that the virtual device used by the at least one application performs the functionality corresponding to the selected external device as if the selected external device were built-in to the end-user device.

11. The system of claim 10, wherein the selected external device comprises at least one of: a camera, a television, a microphone, a smart watch, a heart rate monitor, an automotive head unit from a vehicle, a drone, or a smart lock.

12. The system of claim 10, wherein the identifying the functionality corresponding to the selected external device further comprises:
obtaining, from the selected external device, a set of functions corresponding to the selected external device; or
obtaining the set of functions corresponding to the selected external device from a database based on a previous establishment of the connection with the selected external device.

13. The system of claim 10, wherein the determining the context information of the end-user device further comprises:
determining a location of the end-user device;
determining one or more applications on the end-user device; and
determining characteristics of a type of the end-user device.

14. The system of claim 13, wherein the determining the context information of the end-user device further comprises:
determining at least one function provided by the selected external device not currently available to the one or more applications on the end-user device; and
accessing the at least one function provided by the selected external device based upon requests received from the one or more applications on the end-user device.

15. The system of claim 10, wherein the identifying the virtual device associated with the selected external device comprises:
providing control information to the selected external device to control the selected external device;
receiving at least one device specification corresponding to the selected external device, wherein the at least one device specification comprises a type of a function provided by the selected external device, services of the function, protocols of the function, APIs of the function, and quality of media data provided by the function; and
storing, in a database, the virtual device for the selected external device, wherein functions corresponding to the virtual device are made available for use by the end-user device and to other external devices for use.

16. The system of claim 10, further comprising:
providing, to the end-user device, recommendations of the at least one external device within the proximity to the end-user device based on preferences associated with the end-user device, wherein the preferences are based on at least one of: previous selections of the functionality from the selected external device, applications currently executing on the end-user device, a capability of the end-user device, a location of the end-user device, or a usage time of the end-user device combined with the applications currently executing on the end-user device.

17. The system of claim 16, wherein the providing the recommendations of the at least one external device within the proximity to the end-user device further comprises:
generating predicted likelihoods of external device recommendations based on the preferences associated with the end-user device;
ranking the external device recommendations based on the predicted likelihoods; and
providing the ranked external device recommendations to the end-user device.

18. A non-transitory computer-readable medium storing software comprising instructions executable by one or more processors which, upon such execution, cause a device manager in a hardware abstraction layer (HAL) running on the one or more processors of an end-user device to perform operations comprising:
selecting an external device of at least one external device within proximity to the end-user device;
determining context information of the end-user device;
establishing a connection with the selected external device based on the context information of the end-user device;
identifying functionality corresponding to the selected external device;
identifying a virtual device associated with the selected external device, the virtual device being in the HAL of the end-user device, the virtual device being different from the device manager in the HAL; and
providing the virtual device in the HAL to at least one application at an application layer of the end-user device such that the virtual device used by the at least one application performs the functionality corresponding to the selected external device as if the selected external device were built-in to the end-user device.

19. The non-transitory computer-readable medium of claim 18, wherein the selected external device comprises a camera, a television, a microphone, a smart watch, a heart rate monitor, an automotive head unit from a vehicle, a drone, a smart lock, or other smart device whose service is accessible to the end-user device.

20. The non-transitory computer-readable medium of claim 18, wherein the identifying the functionality corresponding to the selected external device further comprises:
obtaining, from the selected external device, a set of functions corresponding to the selected external device; or
obtaining the set of functions corresponding to the selected external device from a database based on a previous establishment of the connection with the selected external device.

21. The non-transitory computer-readable medium of claim 18, wherein the determining the context information of the end-user device further comprises:
determining a location of the end-user device;
determining one or more applications on the end-user device; and
determining characteristics of a type of the end-user device.

* * * * *